(12) United States Patent
Davis

(10) Patent No.: US 12,166,926 B2
(45) Date of Patent: Dec. 10, 2024

(54) USING STIR/SHAKEN ID HEADERS TO ALLOW ACCESS INTO VoIP NETWORKS

(71) Applicant: Google LLC, Mountain View, CA (US)

(72) Inventor: Howard Davis, Westminster, CO (US)

(73) Assignee: Google LLC, Mountain View, CA (US)

( * ) Notice: Subject to any disclaimer, the term of this patent is extended or adjusted under 35 U.S.C. 154(b) by 355 days.

(21) Appl. No.: 17/677,508

(22) Filed: Feb. 22, 2022

(65) Prior Publication Data

US 2023/0269331 A1    Aug. 24, 2023

(51) Int. Cl.
*H04L 9/30* (2006.01)
*H04L 9/32* (2006.01)
*H04M 7/00* (2006.01)

(52) U.S. Cl.
CPC ............ *H04M 7/0066* (2013.01); *H04L 9/30* (2013.01); *H04L 9/321* (2013.01); *H04L 9/3263* (2013.01)

(58) Field of Classification Search
CPC .. H04M 7/0066; H04M 7/006; H04M 7/0078; H04W 12/12; H04W 12/03; H04W 12/108; H04L 9/30; H04L 9/321; H04L 9/3263; H04L 65/1045; H04L 65/1069; H04L 2209/80; H04L 9/40; H04L 9/3247
See application file for complete search history.

(56) References Cited

U.S. PATENT DOCUMENTS

| | | | |
|---|---|---|---|
| 8,082,580 B1 * | 12/2011 | Desai | H04L 63/029 713/168 |
| 9,660,978 B1 * | 5/2017 | Truskovsky | H04L 63/0823 |
| 10,430,786 B1 * | 10/2019 | Camacho | H04L 9/3268 |
| 2002/0146005 A1 | 10/2002 | Gallant et al. | |
| 2007/0177514 A1 * | 8/2007 | Harrington | H04M 1/24 370/241 |
| 2007/0270126 A1 * | 11/2007 | Forbes | H04L 63/126 455/411 |
| 2009/0046845 A1 | 2/2009 | Lewis et al. | |
| 2013/0054693 A1 * | 2/2013 | Chennamadhavuni | G06Q 10/10 709/204 |
| 2013/0250939 A1 | 9/2013 | Wright | |
| 2014/0036906 A1 | 2/2014 | Somes | |
| 2019/0058594 A1 * | 2/2019 | Kludy | H04L 9/321 |
| 2020/0252503 A1 | 8/2020 | Li | |
| 2021/0092227 A1 * | 3/2021 | Naujok | H04M 3/42034 |
| 2021/0226803 A1 * | 7/2021 | Traynor | H04L 27/12 |

(Continued)

*Primary Examiner* — Lan-Huong Truong

(74) *Attorney, Agent, or Firm* — Lerner David LLP

(57) ABSTRACT

The subject matter described herein provides systems and techniques for adding an identity (ID) header to IP packets associated with a VoIP call. This ID header may be used to authenticate the source provider/originator of a VoIP call, may be used to traceback to the source provider/originator of the VoIP call, and may be used to create a relationship between the source provider/originator and the destination provider/destination of the VoIP call. Such steps may be performed by a public proxy/platform. The ID header may include a certificate and/or a public encryption key, from a public certificate authority (CA) infrastructure, which assists in authenticating the source provider/originator of the VoIP call. The public proxy/platform may directly route authenticated VoIP calls through a VoIP network towards its destination, bypassing a public switched telephone network (PSTN).

20 Claims, 4 Drawing Sheets

(56) References Cited

U.S. PATENT DOCUMENTS

| | | | |
|---|---|---|---|
| 2023/0083081 A1* | 3/2023 | Toscano | H04L 65/1106 379/100.15 |
| 2023/0121137 A1* | 4/2023 | Munoz | H04L 65/1069 709/224 |

\* cited by examiner

USING STIR/SHAKEN ID HEADERS TO ALLOW ACCESS INTO VoIP NETWORKS

BACKGROUND

Some jurisdictions have required the adoption of STIR/SHAKEN protocols and procedures. These protocols and procedures add a trust anchor to the signaling standards used in a voice over internet protocol (VoIP). These protocols and procedures help to add accountability in determining the source of a VoIP call, and also help to avoid spoofing or resource overuse by any particular user and/or service provider in a VoIP network. Access to a VoIP network conventionally occurs by having internet protocol (IP) packets, associated with a VoIP call, routed through firewalls and/or the public switched telephone network (PSTN). In such conventional systems, companies establish a business relationship and sign a contract to exchange traffic. Therefore, such interconnects require manually allowing a VoIP call and its associated IP packets to be routed through the VoIP network. Routing VoIP calls in this way may be inefficient, computationally resource intensive, and not automatic.

BRIEF SUMMARY

In some examples, protocols and procedures, which add a trust anchor to VoIP signaling standards may include an identity (ID) header. This ID header may be used to authenticate the source provider/originator of a VoIP call, and may be used to trace back the call to the source provider/originator. The ID header may include a certificate and/or a public encryption key, from a public certificate authority (CA) infrastructure, which assists in authenticating the source provider/originator of a VoIP call. The certificate and/or public encryption key may be used for an administrative traceback of a VoIP call and associated IP packets to a source provider/originator of the VoIP call.

A public proxy/platform, which may be implemented using one or more electronic devices, may be used to route VoIP calls that have such an ID header. If the ID header is valid, the associated call may be routed through the VoIP network and may bypass a public switched telephone network (PSTN). In addition, the ID header may be used to create a billing relationship between the source provider/originator and the destination provider/destination as a result of the ability to perform an administrative traceback of the VoIP call. Therefore, the ID header may be used to perform VoIP network access, routing, and billing between providers.

In some examples, a query may be sent by a source provider to a public proxy/platform, such as sip.provider.com. The query may initiate a VoIP call. The IP packets associated with the VoIP call may each include a field that includes an ID header. In some examples, the validity of each ID header may be determined by the public proxy/platform. In some examples, the IP packets associated with the VoIP call may include an origination ID value, known as an origID value. This value may identify the source device and/or source provider and may be a part of each ID header or may be the whole or a part of a separate field within each IP packet.

The public proxy/platform may route valid VoIP calls and their associated IP packets to a destination provider via a VoIP network. In addition, the ID header and/or the origID value that may be in each IP packet associated with a VoIP call, may be used to back bill the VoIP call to the source provider via the public proxy/platform. In particular, the ID header may be validated and the ID header and the origID may be used to create a billing relationship between the source provider, identified by the origID value, and the destination provider.

For example, if calls are attested from user A, associated with a source provider, to user B, associated with a destination provider, and these users may be authenticated then interconnection between the users and providers may be performed differently than in conventional systems. Specifically, ID headers in the IP packets associated with each VoIP call from user A to user B may be used to allow network traffic between user A and user B as a function of passing verification/validation.

In general, one aspect of the subject matter described in this specification includes a process of routing a voice over internet protocol (VoIP) call. An internet protocol (IP) packet indicating the initiation of the VoIP call by a source provider may be received using a processor. The IP packet may include an identity (ID) header with a key signature. The VoIP call may be allowed access into a VoIP network based on the key signature. The VoIP call may be routed to a destination provider. The VoIP call may bypass a public switched telephone network (PSTN). The key signature may be a public encryption key signature from a certificate authority. The ID header may be associated with an origination identity (ID) value. A billing relationship may be established between the source provider and the destination provider using the ID header and the origination ID value. The billing relationship may be established using a local number portability (LNP) service and the origination ID value. The VoIP call being allowed access into the VoIP network based on the key signature may be responsive the ID header being validated. The ID header being validated may include portions of the IP packet being decrypted using a private encryption key corresponding to the key signature. The key signature may be used to perform an administrative traceback of the VoIP call. The ID header may be a STIR/SHAKEN ID header. The VoIP call being routed to the destination provider may include VoIP call being routed to the destination provider using a public proxy.

Another aspect of the subject matter includes a non-transitory computer-readable medium storing instructions, that when executed by one or more processors, cause the one or more processors to perform various steps. An internet protocol (IP) packet indicating the initiation of the VoIP call by a source provider may be received using a processor. The IP packet may include an identity (ID) header with a key signature. The VoIP call may be allowed access into a VoIP network based on the key signature. The VoIP call may be routed to a destination provider. The VoIP call may bypass a public switched telephone network (PSTN). The key signature may be a public encryption key signature from a certificate authority. The ID header may be associated with an origination identity (ID) value. A billing relationship may be established between the source provider and the destination provider using the ID header and the origination ID value. The billing relationship may be established using a local number portability (LNP) service and the origination ID value. The VoIP call being allowed access into the VoIP network based on the key signature may be responsive the ID header being validated. The ID header being validated may include portions of the IP packet being decrypted using a private encryption key corresponding to the key signature.

Yet another aspect of the subject matter described in this specification includes a public proxy system for routing a voice over internet protocol (VoIP) call. The publix proxy system may include one or more memories and one or more processors in communication with the one or more memories. The processors may be configured to perform various steps. An internet protocol (IP) packet indicating the initiation of the VoIP call by a source provider may be received using a processor. The IP packet may include an identity (ID) header with a key signature. The VoIP call may be allowed access into a VoIP network based on the key signature. The VoIP call may be routed to a destination provider. The VoIP call may bypass a public switched telephone network (PSTN). The key signature may be a public encryption key signature from a certificate authority. A billing relationship may be established between the source provider and the destination provider using the ID header and an origination identity (ID) value.

DETAILED DESCRIPTION

Figure 1:
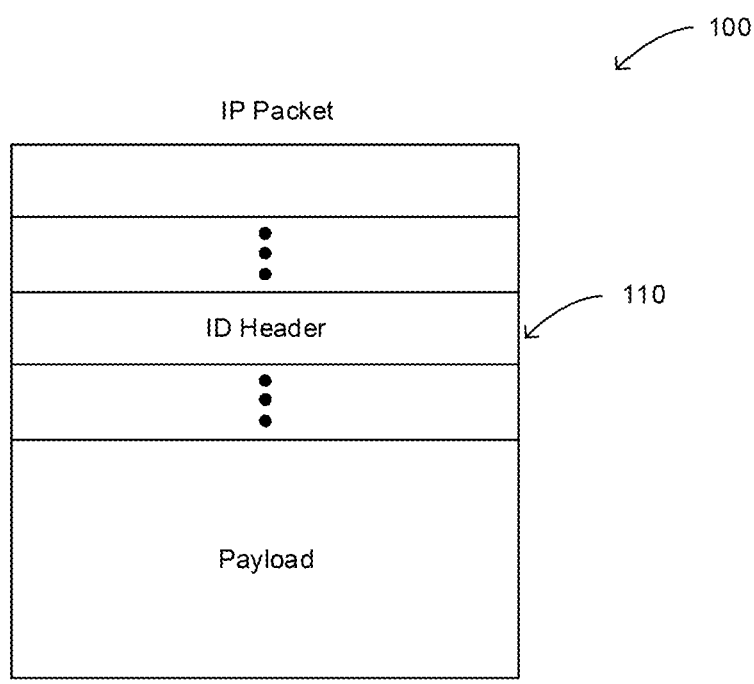
FIG. 1 depicts a data structure of an IP packet associated with a VoIP call.

FIG. 1 depicts a data structure of IP packet 100 associated with a VoIP call. The IP packet 100 may be an IPv6 data packet or an IPv4 data packet or the like. The IP packet 100 may include multiple fields, which may be defined by one or more specifications. For example, IP packet 100 may include a field for an identity (ID) header 110. In some examples, an origID value, identifying the source device and/or source provider may be a part of the ID header 110 or may be the whole or a part of a separate field. For example, the IP packet 100 may include a source identifier, which may sometimes include the origID value, and which may identify a source device and/or a source provider. The IP packet 100 may also include a destination identifier, which may identify a destination device and/or a destination provider. The IP packet 100 may include a payload that may provide data, such as voice data, video data, and/or other data. The IP packet 100 may be sent by the source device or source provider identified by the source identifier towards a destination device or destination provider identified by the destination identifier.

IP packet 100 may include an identity (ID) header 110, such as a STIR/SHAKEN ID header that may be used to verify a source device and/or a source provider and to allow access into a VoIP network. This ID header 110 may be used to authenticate the source provider/originator of a VoIP call, which may be associated with multiple IP packets, such as IP packet 100. The ID header 110 may also be used to traceback a VoIP call to the source provider/originator. In some examples, the ID header 100 may include a certificate and/or a public encryption key, from a public certificate authority infrastructure. The certificate and/or public encryption key may be used to authenticate the source provider/originator of IP packet 100 and its associated VoIP call. In some examples, the certificate and/or public encryption key that may be included in the ID header 110 may be used for an administrative traceback of the VoIP call associated with IP packet 100.

A public proxy/platform, which may be implemented using one or more electronic devices, may be used to route VoIP calls and their associated IP packets that each have such an ID header. The public proxy/platform and/or a public certificate authority (CA) infrastructure may determine if each ID header 110 is valid. For example, the validation of the ID header 110 may include determining whether a certificate and/or public encryption key within the ID header 110 is valid, such as by verifying that the certificate and/or the key is valid and authentic. In some examples, the validation of the ID header 110 may involve the public proxy/platform querying a public CA infrastructure to ensure that the certificate and/or public encryption key is valid. This may involve ensuring the existence of a complementary certificate or corresponding private encryption key stored by the public CA infrastructure.

If the ID header 110 is determined to be valid, the associated IP packets and VoIP calls may be routed through the VoIP network and may bypass a public switched telephone network (PSTN). In addition, the ID header 110 may be used to create a billing relationship between the source provider/originator and the destination provider/destination as a result of the ability to perform an administrative traceback of the VoIP call. In particular, once the ID header 110 of an IP packet 100 is validated, the origID value in the IP packet 100 may be used to trace the associated VoIP call back to the source provider and/or device. Therefore, the ID header 110 may be used to perform VoIP network access, routing, and billing between providers.

Figure 2:
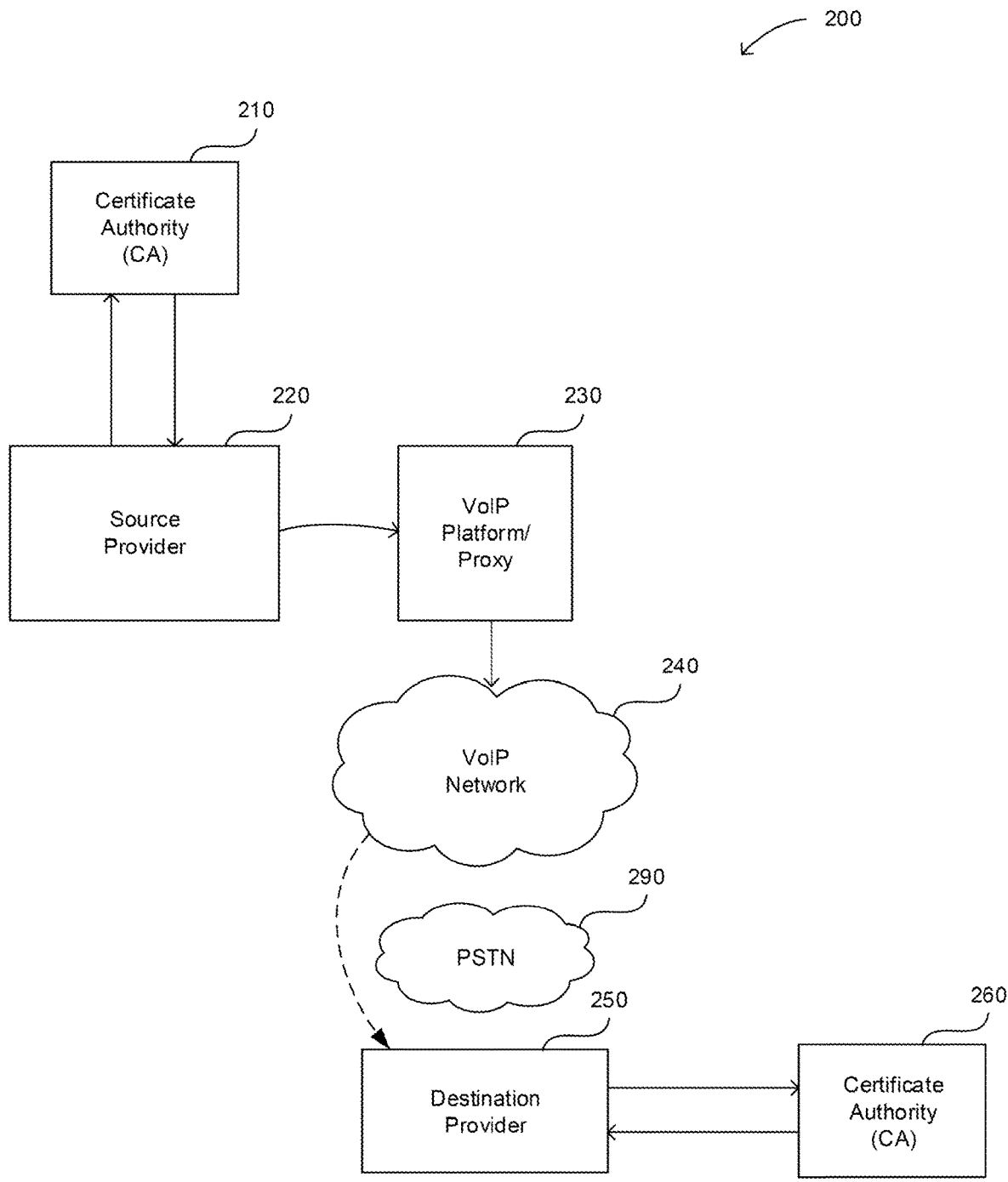
FIG. 2 depicts a system for making VoIP calls and its associated components.

FIG. 2 depicts a system 200 for making VoIP calls and its associated components. The system for making VoIP calls 200 includes certificate authority (CA) 210, source provider 220, VoIP public platform/proxy 230, VoIP network 240, destination provider 250, and CA 260. FIG. 2 also includes public-switched telephone network (PSTN) 290.

CA 210 may be an entity that issues digital certificates. In some examples, such a certificate may certify that a source device and/or source provider has been issued and/or is storing a public encryption key. The CA 210 may store and/or own private encryption keys that each correspond to each of the public encryption keys that the CA 210 issues. Such a private encryption key may be able to decrypt portions of the IP packet and/or the certificate within the ID header. The CA 210 may act as a trusted third party that is trusted by both the owner of the certificate and by the party relying on the certificate.

Source provider 220 may be a service provider that provides VoIP services to consumers or businesses. The source provider 220 may communicate with the CA 210 to receive a digital certificate and/or a public encryption key from the CA 210. The source provider 220 may include the digital certificate and/or the public encryption key in the ID header of each IP packet, such as IP packet 100 described in connection with FIG. 1, associated with a VoIP call. The inclusion of a digital certificate and/or public encryption key may be referred to as a signature or a key signature. Such inclusion of a digital certificate and/or public encryption key in each IP packet may indicate that the source provider 220 signed the IP packet or associated VoIP call. In some examples, the source provider 220 may forward each IP packet to VoIP public platform/proxy 230. In some examples, the initial setup of a VoIP call may involve the source provider 220 sending a query to VoIP public platform/proxy 230 to initiate the VoIP call. For example, the VoIP public platform/proxy 230 may be sip.provider.com.

The VoIP public proxy/platform 230 may determine if the ID header in each IP packet, such as ID header 110 described in connection with FIG. 1, is valid. For example, the validation of the ID header may include determining whether a certificate and/or public encryption key within the ID header is valid, such as by verifying that the certificate and/or the key is valid and authentic. In some examples, the validation of the ID header may involve the VoIP public proxy/platform 230 querying a public certificate authority infrastructure (not shown) to ensure that the certificate and/or public encryption key is valid. This may involve ensuring that a complementary certificate or a corresponding private encryption key stored and/or held by the public certificate authority infrastructure exists. In some examples, the private encryption key may be used to decrypt portions of the IP packet and/or the certificate within the ID header. The validation of the ID header within an IP packet and associated VoIP call may mean that the IP packet and its associated VoIP call is verified/validated.

Once validated, the VoIP public proxy/platform 230 may route the VoIP call and its associated packets through VoIP network 240 to a destination provider 250, bypassing PSTN 290. In some examples, the VoIP public proxy/platform 230 may use the ID header and/or origID value in the IP packet to back bill the routed VoIP call to the source provider 220. In particular, the ID header may be used to create a billing relationship between the source provider 220 and the destination provider 250 as a result of the ability to perform an administrative traceback of the VoIP call. In some examples, once the ID header of an IP packet is validated, the origID value in the IP packet may be used to trace the associated VoIP call back to the source provider and/or device. In some examples, a local number portability (LNP) service or the like, when it is available, may be used together with the origID value to determine billing information for the source provider and/or device. This billing information may be used to create a billing relationship between the destination provider and the source provider. The creation of such a billing relationship, and the steps involved, may be performed by the VoIP public proxy/platform 230.

VoIP network 240 may take many forms, but may include aspects of an existing computer network and/or the Internet, through which IP packets may be routed. The VoIP public proxy/platform 230 may route packets through VoIP network 240 to a destination provider 250. In some examples, the IP packets traversing through VoIP network 240 may bypass the PSTN 290.

Destination provider 250 may be a service provider that provides VoIP services to consumers or businesses. The destination provider 250 may communicate with the CA 260 to validate ID headers within IP packets and their associated VoIP calls that it receives from the VoIP network 240. The destination provider 250 may validate the digital certificate and/or the public encryption key in the ID header of each received IP packet, such as IP packet 100 described in connection with FIG. 1, that it receives. The destination provider 250 may receive such IP packets from a source, such as source provider 220. The digital certificate and/or public encryption key may be referred to as a signature or a key signature. Thus, the destination provider 250 may confirm that the source provider 220 signed the IP packets associated with each VoIP call received from the source provider 220. The VoIP call may then be forwarded to the destination device.

CA 260 may be similar in form and function to CA 210. CA 260 may be an entity that validates digital certificates. In some examples, such a certificate may certify that a source device and/or source provider, originating IP packets associated with a VoIP call, has been issued a public encryption key. The CA 260 may store and/or own private encryption keys that correspond to each of the public encryption keys within the IP packets that it may receive. In some examples, the private encryption key may be used to decrypt portions of the IP packet and/or the certificate within the ID header. The CA 260 may act as a trusted third party that is trusted by both the owner of the certificate and by the party, such as the destination provider 250, relying on the certificate. In some examples, the CA 260 may validate ID headers within IP packets associated with VoIP calls received by the destination provider 250.

In some examples, the source provider 220 and the destination provider 250 may each be a public certificate repository participant. For example, the source provider 220 and the destination provider 250 may be Secure Telephone Identity Governance Authority (STI-GA) certificate repository participants. In addition, the CA 210 and CA 260 and any other CA infrastructure described herein may be part of the public certificate repository. For example, CA 210 and CA 260 and any other CA infrastructure may be a part of the STI-GA infrastructure. Such a public certificate repository may vet its participants, such as any provider making use of the public certificate repository. In addition, such a public repository may be able to revoke participants and/or traffic from any particular source that is not a participant of the public repository.

Figure 3:
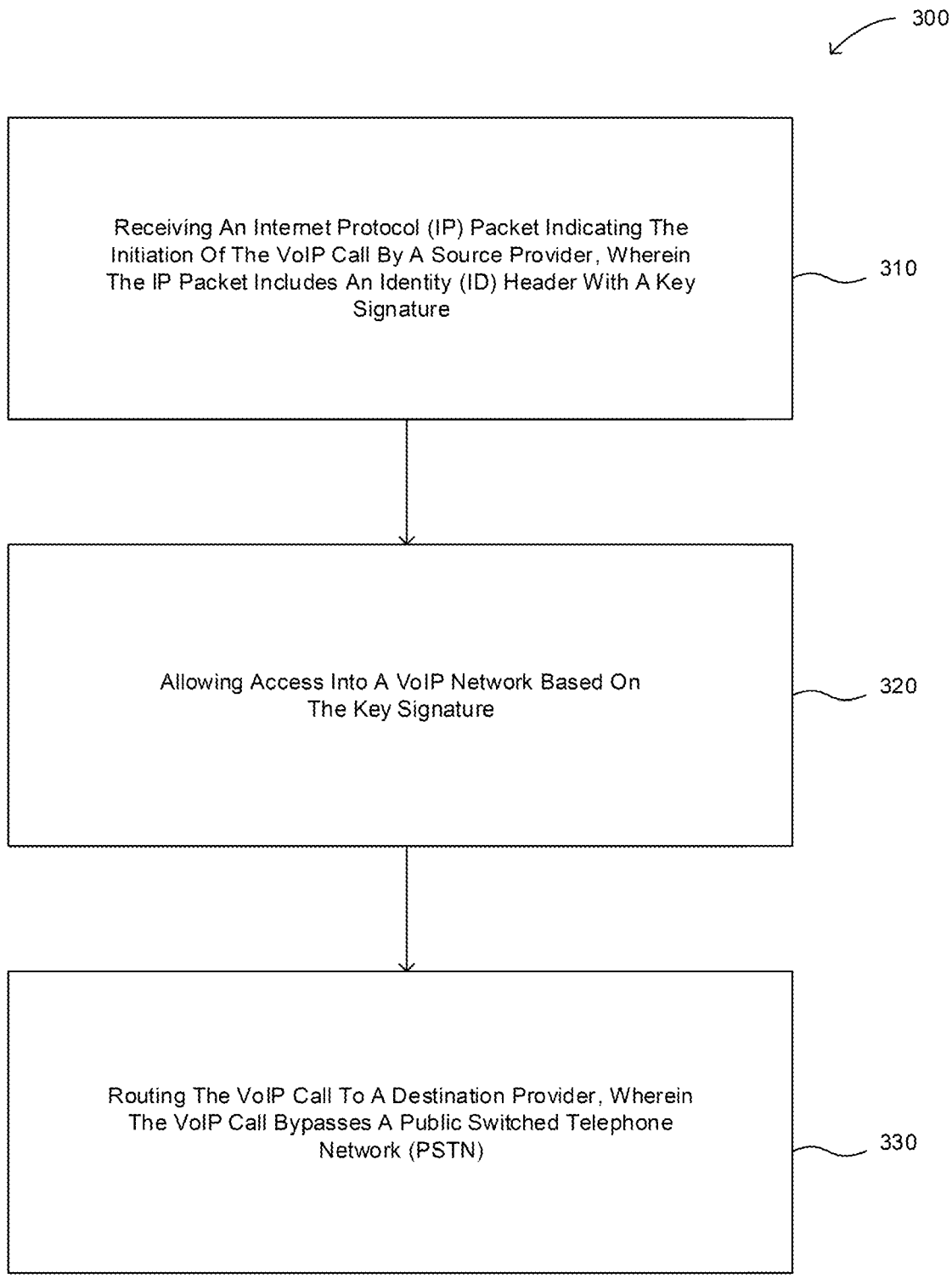
FIG. 3 is a flow diagram of an example process for routing a voice over internet protocol (VoIP) call.

FIG. 3 is a flow diagram of example process 300 for routing a voice over internet protocol (VoIP) call. While the operations of the process 300 are described in a particular order, it should be understood that the order may be modified and operations may be performed in parallel. Moreover, it should be understood that operations may be added or omitted.

In block 310, an internet protocol (IP) packet indicating the initiation of the VoIP call may be received by a source provider, such as source provider 220 described in connection with FIG. 2. The IP packet may be one or more of IP packets associated with a VoIP call. The IP packet may include an identity (ID) header, such as ID header 110 described in connection with FIG. 1, with a key signature. In some examples, the ID header may be a STIR/SHAKEN ID header based on the STIR/SHAKEN protocols and procedures. The key signature may be from a public and/or private certificate authority (CA) infrastructure, such as CA 210 described in connection with FIG. 2. The key signature may be a public encryption key signature with a corresponding private encryption key stored by a CA infrastructure. Each IP packet associated with a VoIP call may be verified/validated based on the ID header within the IP packet being verified/validated. Validation of an IP packet based on validation of the ID header may include decrypting portions of the IP packet and/or the certificate within the ID header encrypted with the public encryption key signature within the ID header. The private encryption key, such as a private encryption key stored and/or held by a public and/or a private certificate authority (CA) infrastructure, may be used to perform such decryption. In some examples, the IP packet and/or its ID header may include and/or be associated with an origination identity (ID) value, origID, which may identify the source device and/or source provider.

In block 320, access by the VoIP call into a VoIP network may be allowed based on the key signature. In some examples, the ID header and/or key signature may be used to perform an administrative traceback of the IP packet and its associated VoIP call. In some examples, the ID header and/or origID value in the IP packet may be used to back bill the routed VoIP call to the source provider. In particular, the ID header may be used to create a billing relationship between the source provider and the destination provider, such as destination provider 250 described in connection with FIG. 2, as a result of the ability to perform an administrative traceback of the VoIP call. In some examples, once the ID header of an IP packet is validated, the origID value in the IP packet may be used to trace the associated VoIP call back to the source provider and/or device. In some examples, a local number portability (LNP) service or the like, when it is available, may be used together with the origID value to determine billing information for the source provider and/or device. This billing information may be used to create a billing relationship between the destination provider and the source provider. The creation of such a billing relationship, and the steps involved, may be performed by the VoIP public proxy/platform 230.

In block 330, the VoIP call may be routed to a destination provider, such as destination provider 250 described in connection with FIG. 2. The VoIP call may bypass a public switched telephone network (PSTN). The routing of the VoIP call may be to the destination provider using a public proxy, such as VoIP public proxy/platform 230 described with reference to FIG. 2. The VoIP call and its associated IP packets may be routed through a VoIP network, such as VoIP network 240 described in connection with FIG. 2.

Figure 4:
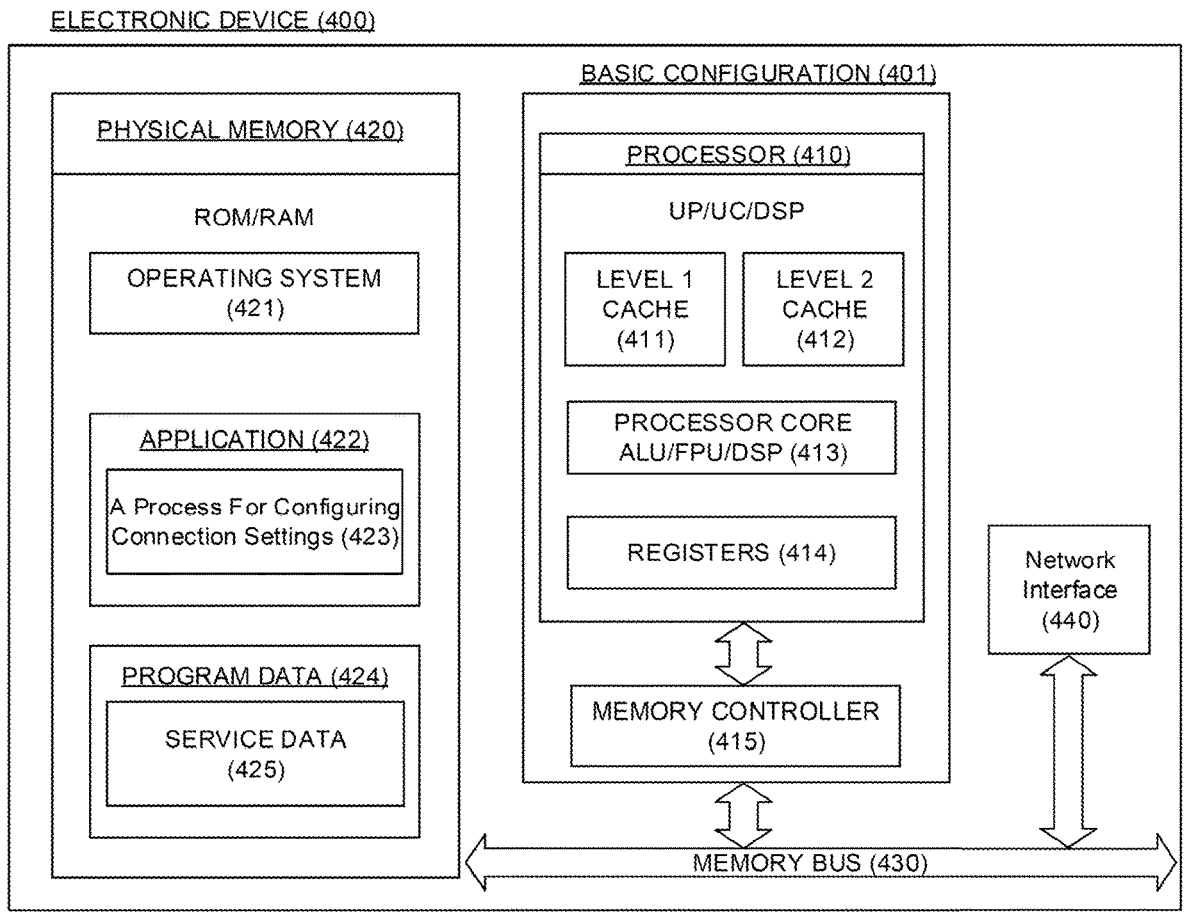
FIG. 4 depicts a block diagram of an example electronic device.

FIG. 4 depicts a block diagram of an example electronic device 400. Electronic device 400 may be any electronic device. The electronic device 400 may include one or more processor 410, system memory 420, a bus 430, the networking interface(s) 440, and other components (not shown), such as storage(s), output device interface(s), input device interface(s). A bus 430 may be used for communicating between the processor 410, the system memory 420, the networking interface(s) 440, and other components. Any or all components of electronic device 400 may be used in conjunction with the subject of the present disclosure. In some examples, one or more components shown in FIG. 2, such as the VoIP public proxy/platform 230, may be implemented using one or more electronic devices, such as electronic device 400.

Depending on the desired configuration, the processor 410 may be of any type including but not limited to a tensor processing unit (TPU), a microprocessor, a microcontroller, a digital signal processor (DSP), or any combination thereof. The processor 410 may include one more level of caching, such as a level one cache 411 and a level two cache 412, a processor core 413, and registers 414. The processor core 413 may include one or more arithmetic logic unit (ALU), one or more floating point unit (FPU), one or more DSP core, or any combination thereof. A memory controller 415 may also be used with the processor 410, or in some implementations the memory controller 415 can be an internal part of the processor 410.

Depending on the desired configuration, the physical memory 420 may be of any type including but not limited to volatile memory, such as RAM, non-volatile memory, such as ROM, flash memory, etc., multiple of these memories, or any combination thereof. The physical memory 420 may include an operating system 421, one or more applications 422, and program data 424, which may include service data 425. Non-transitory computer-readable medium program data 424 may include storing instructions that, when executed by the one or more processing devices, implement a process for routing a voice over internet protocol (VoIP) call 423. In some examples, the one or more applications 422 may be arranged to operate with program data 424 and service data 425 on an operating system 421. The framework and techniques, as described herein, may improve the functioning of a computing and/or electronic device, such as electronic device 400. In addition, the framework and techniques, such as process 423 as described herein, may increase computational efficiency, security, and speed with which any computing system and/or electronic device, implementing such a framework and techniques, may route VoIP when compared to conventional frameworks and techniques.

The electronic device 400 may have additional features or functionality, and additional interfaces to facilitate communications between the basic configuration 401 and any required devices and interfaces.

Physical memory 420 may be an example of computer storage media. Computer storage media includes, but is not limited to, RAM, ROM, EEPROM, flash memory or other memory technology, or any other medium which can be used to store the desired information and which can be accessed by electronic device 400. Any such computer storage media can be part of the device 400.

Network interface(s) 440 may couple the electronic device 400 to a network (not shown) and/or to another electronic device (not shown). In this manner, the electronic device 400 can be a part of a network of electronic devices, such as a local area network ("LAN"), a wide area network ("WAN"), a VoIP network, an intranet, or a network of networks, such as the Internet. In some examples, the electronic device 400 may include a network connection interface for forming a network connection to a network and a local communications connection interface for forming a tethering connection with another device. The connections may be wired or wireless. The electronic device 400 may bridge the network connection and the tethering connection to connect the other device to the network via the network interface(s) 440.

Aspects of the present disclosure may be implemented as a computer implemented process, a system, or as an article of manufacture such as a memory device or non-transitory computer readable storage medium. The computer readable storage medium may be readable by an electronic device and may comprise instructions for causing an electronic device or other device to perform processes and techniques described in the present disclosure. The computer readable storage medium may be implemented by a volatile computer memory, non-volatile computer memory, solid state memory, flash drive, and/or other memory or other non-transitory and/or transitory media. Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible examples. Further, the same reference numbers in different drawings can identify the same or similar elements.

Numerous examples are described in the present application, and are presented for illustrative purposes only. The described examples are not, and are not intended to be, limiting in any sense. One of ordinary skill in the art will recognize that the disclosed subject matter may be practiced with various modifications and alterations, such as structural, logical, software, and electrical modifications. It should be understood that the described features are not limited to usage in the one or more particular examples or drawings with reference to which they are described, unless expressly specified otherwise.

The invention claimed is:

1. A method of routing a voice over internet protocol (VOIP) call, the method comprising:
   receiving, using a processor, an internet protocol (IP) packet indicating the initiation of the VoIP call by a source provider, wherein the IP packet includes an identity (ID) header with a key signature;
   validating, using the processor, the ID header based on the key signature to allow the VoIP call access into a VoIP network; and
   routing, using the processor, the VoIP call through the VoIP network to a destination provider, wherein the VoIP call bypasses a public switched telephone network (PSTN).

2. The method of claim 1, wherein the key signature is a public encryption key signature from a certificate authority.

3. The method of claim 1, wherein the ID header is associated with an origination ID value.

4. The method of claim 3, further comprising establishing, using the processor, a billing relationship between the source provider and the destination provider using the ID header and the origination ID value.

5. The method of claim 4, wherein the billing relationship is established using a local number portability (LNP) service and the origination ID value.

6. The method of claim 1, further comprising allowing, using the processor, the VoIP call access into the VoIP network in response to validating the ID header.

7. The method of claim 6, wherein validating the ID header comprises decrypting portions of the IP packet using a private encryption key corresponding to the key signature.

8. The method of claim 1, wherein the key signature is used to perform an administrative traceback of the VOIP call.

9. The method of claim 1, wherein the ID header is a STIR/SHAKEN ID header.

10. The method of claim 1, wherein routing the VoIP call to the destination provider comprises routing the VoIP call to the destination provider using a public proxy.

11. A non-transitory computer-readable medium storing instructions, that when executed by one or more processors, cause the one or more processors to perform operations comprising:
    receiving an internet protocol (IP) packet indicating the initiation of a voice over internet protocol (VOIP) call by a source provider, wherein the IP packet includes an identity (ID) header with a key signature;
    validating the ID header based on the key signature to allow the VoIP call access into a VOIP network; and
    routing the VoIP call through the VoIP network to a destination provider, wherein the VOIP call bypasses a public switched telephone network (PSTN).

12. The non-transitory computer-readable medium of claim 11, wherein the key signature is a public encryption key signature from a certificate authority.

13. The non-transitory computer-readable medium of claim 11, wherein the ID header is associated with an origination ID value.

14. The non-transitory computer-readable medium of claim 13, wherein the operations further comprise establishing a billing relationship between the source provider and the destination provider using the ID header and the origination ID value.

15. The non-transitory computer-readable medium of claim 14, wherein the billing relationship is established using a local number portability (LNP) service and the origination ID value.

16. The non-transitory computer-readable medium of claim 11, wherein the operations further comprise allowing the VoIP call access into the VoIP network in response to validating the ID header.

17. The non-transitory computer-readable medium of claim 16, wherein the operations further comprise decrypting portions of the IP packet using a private encryption key corresponding to the key signature.

18. A public proxy system for routing a voice over internet protocol (VOIP) call, the public proxy system comprising:
    one or more processors; and
    one or more memories in communication with the one or more memories, the one or more memories storing instructions that, when executed by the one or more processors, cause the one or more processors to perform operations comprising:
        receiving an internet protocol (IP) packet indicating the initiation of a voice over internet protocol (VOIP) call by a source provider, wherein the IP packet includes an identity (ID) header with a key signature;
        validating the ID header based on the key signature to allow the VoIP call access into a VoIP network; and
        routing the VoIP call through the VoIP network to a destination provider, wherein the VoIP call bypasses a public switched telephone network (PSTN).

19. The public proxy system of claim 18, wherein the key signature is a public encryption key signature from a certificate authority.

20. The public proxy system of claim 18, wherein the operations further comprise establishing a billing relationship between the source provider and the destination provider using the ID header and an origination ID value.

* * * * *